US012725801B2

(12) United States Patent
Hosoe

(10) Patent No.: US 12,725,801 B2
(45) Date of Patent: Sep. 1, 2026

(54) NEGATIVE ELECTRODE ACTIVE MATERIAL, NEGATIVE ELECTRODE USING THE NEGATIVE ELECTRODE ACTIVE MATERIAL AND METHOD FOR MANUFACTURING NEGATIVE ELECTRODE ACTIVE MATERIAL

(71) Applicant: Prime Planet Energy & Solutions, Inc., Tokyo (JP)

(72) Inventor: Kento Hosoe, Miyoshi (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 678 days.

(21) Appl. No.: 18/171,675

(22) Filed: Feb. 21, 2023

(65) Prior Publication Data

US 2023/0268507 A1 Aug. 24, 2023

(30) Foreign Application Priority Data

Feb. 22, 2022 (JP) ................................ 2022-025863

(51) Int. Cl.
*H01M 4/587* (2010.01)
*C01B 32/21* (2017.01)
(Continued)

(52) U.S. Cl.
CPC ............. *H01M 4/587* (2013.01); *C01B 32/21* (2017.08); *H01M 4/133* (2013.01); *H01M 10/0525* (2013.01); *C01P 2004/32* (2013.01); *C01P 2004/84* (2013.01); *C01P 2006/16* (2013.01); *C01P 2006/40* (2013.01); *H01M 2004/021* (2013.01); *H01M 2004/027* (2013.01)

(58) Field of Classification Search
CPC ...... H01M 4/583; H01M 4/587; H01M 4/133; H01M 2004/027; H01M 4/62; C01P 2006/01
See application file for complete search history.

(56) References Cited

U.S. PATENT DOCUMENTS 6,692,718 B1 2/2004 Osawa
2009/0269669 A1* 10/2009 Kim ................. H01M 10/0525 427/113

(Continued)

FOREIGN PATENT DOCUMENTS

| | | | |
|---|---|---|---|
| JP | 2015513185 | A | 4/2015 |
| JP | 2021501976 | A | 1/2021 |
| WO | 0073206 | A1 | 12/2000 |

OTHER PUBLICATIONS

Song, Y. et al. Nanodiamonds: a critical component of anodes for high performance lithium-ion batteries. Chemical Communications. 52, 10497 (Year: 2016).*

(Continued)

*Primary Examiner* — Marla D McConnell
*Assistant Examiner* — Julia S Caserto
(74) *Attorney, Agent, or Firm* — HAUPTMAN HAM, LLP

(57) ABSTRACT

A negative electrode active material for a lithium ion secondary battery includes a graphite particle coated on the surface with an amorphous carbon and an insulating inorganic particle. The graphite particle has a pore of 1 μm or less. The insulating inorganic particle has an average particle diameter ($D_{50}$) of 100 nm or less, and is present in the pore of the graphite particle.

6 Claims, 2 Drawing Sheets

(51) Int. Cl.

| | |
|---|---|
| ***H01M 4/02*** | (2006.01) |
| ***H01M 4/133*** | (2010.01) |
| ***H01M 10/0525*** | (2010.01) |

(56) References Cited

U.S. PATENT DOCUMENTS

| | | | | |
|---|---|---|---|---|
| 2014/0227588 | A1 | 8/2014 | Kim et al. | |
| 2015/0180019 | A1* | 6/2015 | Lee | H01M 4/134<br>264/105 |
| 2020/0343544 | A1* | 10/2020 | Choi | H01M 4/5825 |

OTHER PUBLICATIONS

Xuan, G. et al. A carbon-based anode combining with SiOx and nanodiamond for high performance lithium ion battery. Journal of Energy Storage. 25, 100901 (Year: 2019).*

* cited by examiner

NEGATIVE ELECTRODE ACTIVE MATERIAL, NEGATIVE ELECTRODE USING THE NEGATIVE ELECTRODE ACTIVE MATERIAL AND METHOD FOR MANUFACTURING NEGATIVE ELECTRODE ACTIVE MATERIAL

The present application claims priority from Japanese Patent Application No. 2022-025863 filed on Feb. 22, 2022, which is incorporated by reference herein in its entirety.

BACKGROUND

The present disclosure relates to a negative electrode active material, a negative electrode using the negative electrode active material, and a method for manufacturing a negative electrode active material.

In recent years, a secondary battery (e.g., a lithium ion secondary battery) has been preferably used as a portable power supply for a personal computer, a portable terminal, or the like, or a driving power supply to be mounted on a vehicle such as a hybrid vehicle (HEV), a plug-in hybrid vehicle (PHEV), or an electric vehicle (BEV).

The negative electrode of a secondary battery, particularly, the negative electrode for a lithium ion secondary battery typically has a configuration in which the negative electrode active material layer including a negative electrode active material such as a carbon material is supported by a negative electrode collector. The negative electrode active material is a substance capable of reversibly occluding and releasing a lithium ion of an electric charge carrier. For example, Japanese Unexamined Patent Application Publication (Translation of PCT Application) No. 2015-513185 discloses a negative electrode including a spherical natural graphite coated on the surface with an amorphous carbon. Further, Japanese Unexamined Patent Application Publication (Translation of PCT Application) No. 2021-501976 discloses a negative electrode active material including a spheroidal carbon type particle, and a carbon layer including a nano particle arranged on the spheroidal carbon type particle, where the nano particle includes a silicon core, and an oxide film layer arranged on the silicon core, and including $SiO_x$, and a coating layer covering at least a part of the oxide film layer. The following is disclosed: in accordance with the technology disclosed in Japanese Unexamined Patent Application Publication (Translation of PCT Application) No. 2021-501976, $SiO_x$ contributes to the charging and discharging reaction, which enables a higher capacity and a high initial efficiency.

SUMMARY

Incidentally, it is considered that even for a graphite particle coated on the surface with an amorphous carbon, the pore portion of the graphite particle is not coated. The portion has a high reactivity with Li ions, and hence, decomposition of the electrolyte is excessively effected. As a result of this, the storage characteristic of the secondary battery may be deteriorated. Further, the portion has a high reactivity with, Li ions, and hence, can become the starting point of Li precipitation in, for example, a large current pulse test.

The present disclosure was completed in view of such a point. It is an object of the present disclosure to provide a negative electrode active material capable of imparting a secondary battery with excellent storage characteristic and metal lithium precipitation resistance. Further, it is another object thereof to provide a negative electrode including the negative electrode active material, and a method for manufacturing a negative electrode active material.

In order to attain the objects, the negative electrode active material herein disclosed is provided. The negative electrode active material herein disclosed is a negative electrode active material for a lithium ion secondary battery, and includes a graphite particle coated on the surface with an amorphous carbon, and an insulating inorganic particle. The graphite particle has a pore with a pore size of 1 μm or less. The insulating inorganic particle has an average particle diameter ($D_{50}$) of 100 nm or less. The insulating inorganic particle is present in the pore of the graphite particle.

With such a configuration, it is possible to implement a negative electrode active material for imparting a secondary battery with excellent storage characteristic and metal lithium precipitation resistance.

In accordance with preferable one aspect of the negative electrode active material herein disclosed, the insulating inorganic particle is at least one selected from the group consisting of boehmite, alumina, and nanodiamond.

With such a configuration, it is possible to provide a negative electrode active material for imparting a secondary battery with still more excellent storage characteristic and metal lithium precipitation resistance.

In accordance with preferable one aspect of the negative electrode active material herein disclosed, the graphite particle has a pore of 200 nm or less. Further, in accordance with another preferable aspect, the graphite particle is a spheroidized graphite resulting from spheroidization of a scaly graphite.

With such a configuration, it is possible to provide a negative electrode active material for imparting a secondary battery with a still more excellent storage characteristic and metal lithium precipitation resistance.

Furthermore, the technology herein disclosed provides a negative electrode for a lithium ion secondary battery. The negative electrode includes a negative electrode collector, and a negative electrode active material layer provided on the negative electrode collector. The negative electrode active material layer includes the negative electrode active material.

With such a configuration, it is possible to provide a negative electrode capable of sufficiently exhibiting the effects of the negative electrode active material having the characteristics as described above.

Further, the technology herein disclosed provides a method for manufacturing a negative electrode active material for a lithium ion secondary battery. Such a method for manufacturing a negative electrode active material includes a step of preparing a paste including at least a graphite particle coated on the surface with an amorphous carbon, and an insulating inorganic particle, and a step of drying the prepared paste. The graphite particle for use in the preparing step has a pore with a pore size of 1 μm or less. The insulating inorganic particle for use in the preparing step has an average particle diameter ($D_{50}$) of 100 nm or less. The method is characterized in that at the drying step, drying is performed so that the pore of the graphite particle is filled with the insulating inorganic particle.

With such a configuration, it is possible to preferably manufacture a negative electrode active material for imparting a secondary battery with excellent storage characteristic and metal lithium precipitation resistance.

In accordance with preferable one aspect of the manufacturing method herein disclosed, at the drying step, drying is performed so that the insulating inorganic particle is filled in 8% or more of the volume of the pore for every 100% of the total volume of the pore of 1 μm or less of the graphite particle.

With such a configuration, it is possible to preferably manufacture a negative electrode active material for imparting a secondary battery with excellent storage characteristic and metal lithium precipitation resistance.

DETAILED DESCRIPTION

Figure 1:
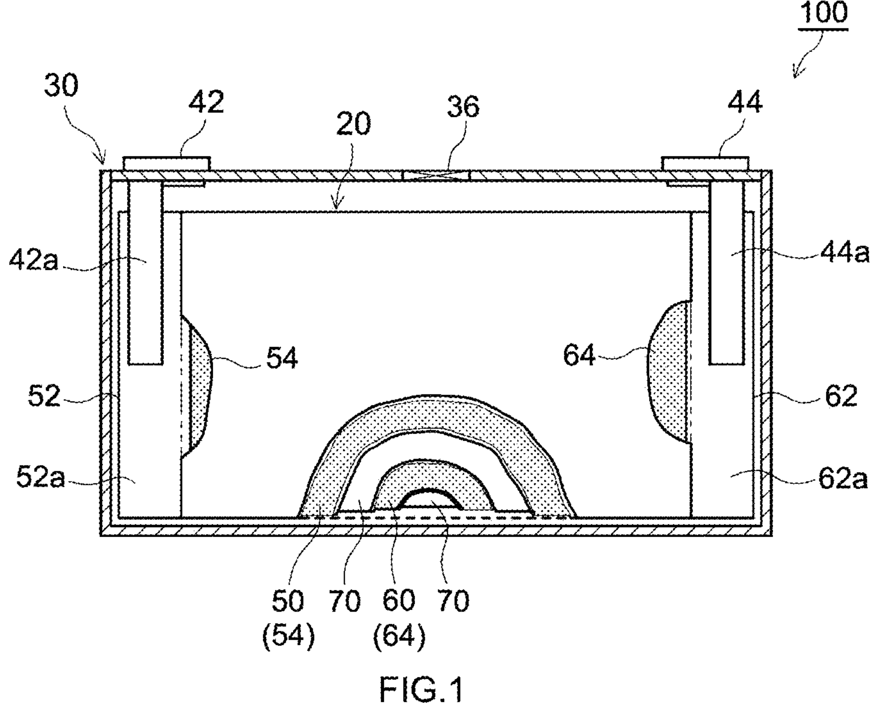
FIG. 1 is a longitudinal cross sectional view schematically showing the internal structure of a lithium ion secondary battery in accordance with one embodiment.

Below, one embodiment of the technology herein disclosed will be described. It is naturally understood that the embodiment herein disclosed is not intended to limit particularly the technology herein disclosed. The technology herein disclosed is not limited to the embodiments herein described unless particularly referred to. Each drawing is drawn schematically, and does not necessarily reflect the actual object. Further, in each drawing, the members or sites producing the same action are given the same reference numeral and sign, and an overlapping description may be omitted or simplified. Furthermore, the dimensional relationship (the length, the width, the thickness, or the like) in each drawing does not reflect the actual dimensional relationship. Still further, the expression "A to B" indicative of the numerical range means "A or more and B or less" unless particularly referred to.

In the present specification, the term "secondary battery" represents a battery in general capable of repeatedly performing charging and, is the term including a capacitor such as an electric double layer capacitor other than so-called storage batteries such as a lithium ion secondary battery and a nickel hydrogen battery. Further, in the present specification, the term "lithium ion secondary battery" represents a secondary battery using lithium ions as electric charge carriers, and implementing charging and discharging due to transfer of electric charges accompanying lithium ions between positive and negative electrodes.

1. Lithium Ion Secondary Battery

Figure 2:
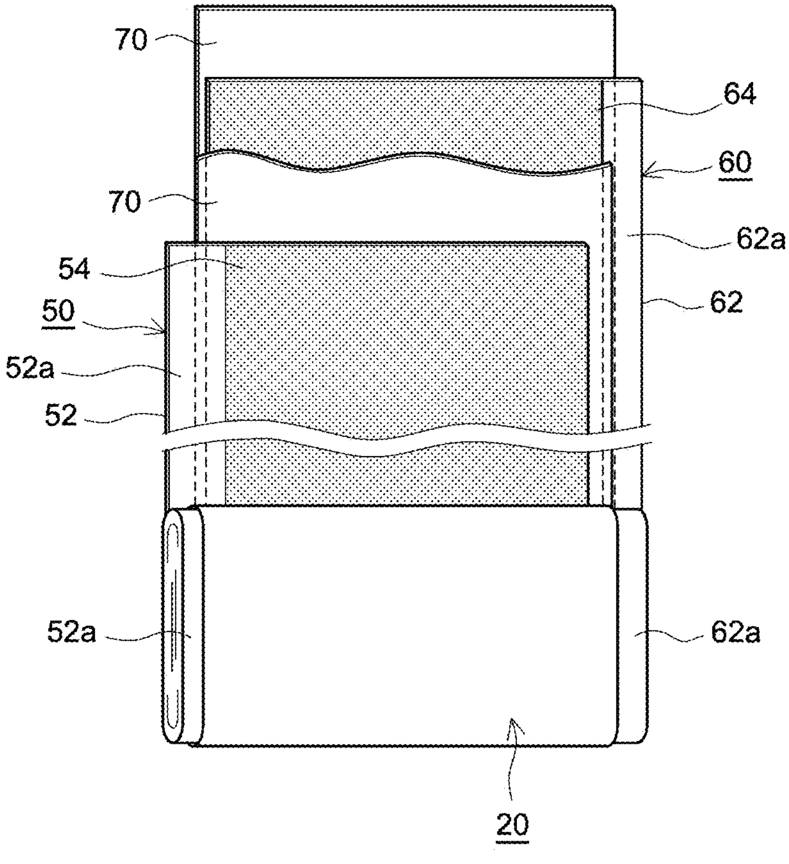
FIG. 2 is a schematic view showing a configuration of an electrode body of a lithium ion secondary battery in accordance with one embodiment.

FIG. 1 is a longitudinal cross sectional view of a lithium ion secondary battery in accordance with one embodiment. FIG. 2 is a view schematically showing the internal structure of a lithium ion secondary battery. Below, with reference to FIGS. 1 and 2, the negative electrode active material and the negative electrode herein disclosed will be described.

A lithium ion secondary battery 100 shown in FIG. 1 is a closed type battery constructed by accommodating an electrode body 20 and a nonaqueous electrolyte solution not shown in a flat rectangular battery case (e.g., an exterior container) 30. The battery case 30 is provided with a positive electrode terminal 42 and a negative electrode terminal 44 for external connection, and a thin-walled safety valve 36 set for relaxing the internal pressure when the internal pressure of the battery case 30 increases to a prescribed level, or higher. Further, the battery case 30 is provided with an introduction port (not shown) for introducing a nonaqueous electrolyte. The positive electrode terminal 42 is electrically connected with a positive electrode collector sheet **42*a*. The negative electrode terminal 44 is electrically connected with a negative electrode collector sheet 44*a*. As the material for the battery case 30**, for example, a metal material which is lightweight and has good thermal conductivity such as aluminum is used.

The lithium ion secondary battery 100 includes a nonaqueous electrolyte as described above. The nonaqueous electrolyte may be the same as conventional ones, and has no particular restriction. The nonaqueous electrolyte is, for example, a nonaqueous electrolyte solution including a nonaqueous type solvent and a support salt. The nonaqueous type solvent includes, for example, carbonates such as ethylene carbonate, dimethyl carbonate, and ethyl methyl carbonate. The support salt is, for example, a fluorine-containing lithium salt such as LiPF6.

As shown in FIG. 2, the electrode body 20 has a long sheet-shaped positive electrode 50 (which will be also hereinafter referred to as a "positive electrode sheet 50"), a long sheet-shaped negative electrode 60 (which will be also hereinafter referred to as a "negative electrode sheet 60"), and a long sheet-shaped separator 70 (which will be also hereinafter referred to as a "separator sheet 70"). The electrode body 20 may be a wound electrode body obtained, for example, by stacking the positive electrode sheet 50 and the negative electrode sheet 60 via two separator sheets 70, and winding them in the longitudinal direction. The positive electrode sheet 50 has a configuration in which a positive electrode active material layer 54 is formed along the longitudinal direction on one surface or both surfaces (herein, both surfaces) of the long positive electrode collector 52. The negative electrode sheet 60 has a configuration in which a negative electrode active material layer 64 is formed along the longitudinal direction on one surface or both surfaces (herein, both surfaces) of the long negative electrode collector 62.

A positive electrode collector exposed part **52*a* (i.e., the part in which the positive electrode collector 52 is exposed without formation of the positive electrode active material layer 54) and a negative electrode collector exposed part 62*a* (i.e., the part in which the negative electrode collector 62 is exposed without formation of the negative electrode active material layer 64) are formed in such a manner as to protrude outward from the both ends in the winding axis direction (i.e., the sheet width direction orthogonal to the longitudinal direction) of the electrode body 20. The positive electrode collector exposed part 52*a* and the negative electrode collector exposed part 62*a* are joined with a positive electrode collector sheet 42*a* and a negative electrode collector sheet 44*a***, respectively.

Incidentally, the electrode body 20 may be, for example, a laminated electrode body obtained by stacking a prescribed number of positive electrode sheets and negative electrode sheets alternately with a separator sheet interposed therebetween. With such a laminated electrode body, a core part is formed at the central part in the width direction in which a plurality of positive electrode active material layers and negative electrode active material layers are stacked in an opposing manner. Further, at one side edge in the width direction, a positive electrode collector part including a plurality of positive electrode collector exposed parts stacked therein is formed. At the other end, a negative electrode collector part including a plurality of negative electrode collector exposed parts stacked therein is formed.

Examples of the positive electrode collector 52 forming the positive electrode sheet 50 may include aluminum foil. The dimension of the positive electrode collector 52 has no particular restriction, and may be appropriately determined according to the battery design. The positive electrode active material layer 54 includes at least a positive electrode active material. Examples of the positive electrode active material may include lithium transition metal oxides (e.g., $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$), and a lithium transition metal phosphate compound (e.g., $LiFePO_4$). Although not particularly restricted, the content of the positive electrode active material may be roughly 80 mass % or more, typically 90 mass % or more, and for example, 95 mass % or more for every 100 mass % of the total solid content of the positive electrode active material layer 54. The positive electrode active material layer 54 may include given components other than the positive electrode active material, for example, a conductive material, a binder, and various additive components. As the conductive material, for example, a carbon material such as acetylene black (AB) can be used. As the binder, for example, polyvinylidene fluoride (PVDF) can be used.

The separator sheet 70 is arranged between the positive electrode active material layer 54 of the positive electrode sheet 50 and the negative electrode active material layer 64 of the negative electrode sheet 60, and establishes an insulation between the positive electrode active material layer 54 and the negative electrode active material layer 64. The separator sheet 70 is formed of a porous resin base material. Examples of the resin base material may include a sheet (film) made of a resin including polyolefins such as polyethylene (PE) and polypropylene (PP), polyester, polyamide, cellulose, or the like. The separator sheet 70 may have a monolayered structure, and may have a structure including two or more porous resin sheets having different properties and performances (such as the thickness and the porosity) stacked therein (e.g., a three-layered structure including PP layers stacked on both surfaces of a PE layer). Alternatively, the separator sheet 70 may include on the surface thereof a heat resistant layer (HRL layer) formed of ceramic particles or the like. The HRL may be the same as the heat resistant layer included in the separator of a known nonaqueous electrolyte secondary battery, and includes, for example, a ceramic particle of alumina, silica, boehmite, magnesia, titania, or the like, and a binder such as PVDF.

As the material for the negative electrode collector 62 forming the negative electrode sheet 60, a metal with good electric conductivity (e.g., copper, nickel, titanium, or stainless steel) can be used as with a conventional secondary battery. Out of these, copper is preferable. As the negative electrode collector 62, for example, copper foil is preferable. The dimension of the negative electrode collector 62 has no particular restriction, and may be appropriately determined according to the battery design. When copper foil is used as the negative electrode collector 62, the thickness thereof may be, for example, 5 μm or more and 35 μm or less, and preferably 7 μm or more and 20 μm or less.

The negative electrode active material layer 64 includes the negative electrode active material herein disclosed. The negative electrode active material includes a material capable of inserting/eliminating lithium ions of electric charge carriers. The negative electrode active material includes at least a graphite particle coated on the surface with an amorphous carbon and an insulating inorganic particle.

The graphite particle coated on the surface with an amorphous carbon (which will be also hereinafter referred to as an "amorphous carbon-coated graphite") may only be coated on at least a partial surface of the graphite particle (core) with an amorphous carbon material, and has no particular restriction. The graphite particle (core) may be a natural graphite, or may be an artificial graphite. The amorphous carbon-coated graphite is preferably coated on the whole surface of the graphite particle with an amorphous carbon. The amorphous carbon is relatively lower in reactivity with a nonaqueous electrolyte solution. For this reason, coating of the surface of the graphite particle with an amorphous carbon can suppress excessive reaction between the graphite particle and the nonaqueous electrolyte solution. This can contribute to the improvement of the storage characteristic of the lithium ion secondary battery 100.

Although the shape of the amorphous carbon-coated graphite has no particular restriction, it is preferably generally spheroidal. For example, the graphite particle to be the core of the amorphous carbon-coated graphite is preferably a spheroidized graphite obtained by applying a scaly graphite with a stress for spheroidization. For a spheroidized graphite, the edge surface with a high reactivity with a nonaqueous electrolyte solution is bent and folded. This can preferably suppress the contact between the edge surface and the nonaqueous electrolyte solution, which can suppress excessive decomposition of the nonaqueous electrolyte solution. Preferably, an amorphous carbon-coated graphite is coated on the surface of the spheroidized graphite with an amorphous carbon.

Incidentally, in the present specification, the term "generally spheroidal shape" is the term including even a spherical shape, a rugby ball shape, a polyhedron shape, or other shapes, and represents the one with an average aspect ratio (the ratio of the length in the major axis direction to the length in the minor axis direction in the minimum rectangle circumscribing the particle) of roughly 1 or more and 2 or less, and for example, 1 or more and 1.5 or less. For such an aspect ratio, there can be adopted the arithmetic average value of the length in the major axis direction to the length in the minor direction in the minimum rectangle circumscribing 50 or more active material particles selected in a plurality of (e.g., two or more) observation images using an electron microscope.

The average particle diameter ($D_{50}$) of the amorphous carbon-coated graphite has no particular restriction, and may be comparable to the average particle diameter of the negative electrode active material adopted for a conventional secondary battery. The average particle diameter of the amorphous carbon-coated graphite is, for example, 3 μm or more, preferably 5 μm or more, and more preferably 7 μm or more. On the other hand, the upper limit of the average particle diameter of the amorphous carbon-coated graphite is typically 50 μm or less, preferably 25 μm or less, and more preferably 20 μm or less.

Incidentally, in the present specification, the term "average particle diameter" means the particle diameter ($D_{50}$) at a cumulative value of 50% from the smaller particle diameter side in the particle size distribution on a volume basis measured by a particle size distribution measuring device based on the laser diffraction/scattering method unless particularly referred to.

The amorphous carbon-coated graphite has a pore with a pore size of 1 μm or less. A graphite particle is normally not fully coated with an amorphous carbon. Namely, such a pore of 1 μm or less results from the portion not coated. For example, a plurality of such pores can be present in the inside of the graphite particle. The graphite particle can be, for example, a porous particle. The pore included in the amorphous carbon-coated graphite preferably has a pore size of 200 nm or less. The lower limit of the pore size of the amorphous carbon-coated graphite is not particularly limited, but, for example, the pore size is preferably 1 nm or more, and may be 10 nm or more, or may be 100 nm or more.

Incidentally, the pore of the amorphous carbon-coated graphite can be measured by using, for example, a mercury porosimeter.

The negative electrode active material herein disclosed includes an insulating inorganic particle in addition to the foregoing amorphous carbon-coated graphite. The insulating inorganic particle is a particle not involved in the charging and discharging reaction. Such an insulating inorganic particle is present in the pore of 1 μm or less of the amorphous carbon-coated graphite. As a result of this, it is possible to implement a negative electrode active material for imparting a secondary battery with excellent storage characteristic and metal lithium precipitation resistance.

Although it is not intended to limit the technology herein disclosed, the reason why such an effect can be obtained is presumed as follows. Even when the surface of the graphite particle is coated with an amorphous carbon, it is not fully coated as described above. Particularly, a plurality of pores of about 1 μm or less can be present in the inside of the graphite particle. According to the results of the study by the present inventors, in the portion (i.e., the pore) not coated with an amorphous carbon in the graphite particle, the edge surface with a high reactivity is exposed, and tends to excessively react with the nonaqueous electrolyte solution. As a result of this, the storage characteristic of the secondary battery can be deteriorated. Further, the portion not coated with an amorphous carbon can become a starting point for Li ion precipitation, for example, when charging and discharging are carried out with a large current. Thus, for the negative electrode active material herein disclosed, the pore (i.e., the portion not coated with an amorphous carbon) of the amorphous carbon-coated graphite is filled with insulating inorganic particles not reacting with Li. This can suppress the excessive reaction with the nonaqueous electrolyte solution in the pore of the amorphous carbon-coated graphite, and the uncoated portion from becoming the starting point of precipitation of metal lithium at the time of a large current. For this reason, it is possible to implement a negative electrode active material for imparting a secondary battery with an excellent storage characteristic and an excellent metal lithium precipitation resistance.

For the negative electrode active material herein disclosed, the insulating inorganic particles are present in the pore of 1 μm or less of the amorphous carbon-coated graphite. For the insulating inorganic particle, at least 50% or more thereof may only be present in the pore of 1 μm or less of the amorphous carbon-coated graphite, 75% or more thereof is preferably present in the pore of 1 μm or less of the amorphous carbon-coated graphite, 90% or more thereof is more preferably present in the 1-μm or less pore of the amorphous carbon-coated graphite, further preferably 99% or more thereof is preferably present in the pore of 1 μm or less of the amorphous carbon-coated graphite, and for example, all (i.e., 100%) of the insulating inorganic particles may be present in the pore of 1 μm or less of the amorphous carbon-coated graphite.

Incidentally, the presence of the insulating inorganic particles in the pores of the amorphous carbon-coated graphite can be observed by acquiring the cross sectional SEM observation image of the negative electrode active material, and analyzing the image using commercially available image analysis software.

The average particle diameter ($D_{50}$) of the insulating inorganic particles for use in the technology herein disclosed may only be the size enough to be filled in the pore of the amorphous carbon-coated graphite, and may desirably be 100 nm or less. The average particle diameter of the insulating inorganic particles is, for example, 100 nm or less, is preferably 92 nm or less, may be 75 nm or less, and may be 54 nm or less. From the viewpoint of the dispersibility, or the like, the average particle diameter of the insulating inorganic particles is preferably, for example, 1 nm or more, more preferably 14 nm or more, may be 25 nm or more, and may be 49 nm or more. An insulating inorganic particle having an average particle diameter within such a range can be preferably filled in the pore of the amorphous carbon-coated graphite. As a result of this, it is possible to provide a negative electrode for imparting an excellent metal lithium precipitation resistance and an excellent storage characteristic to a secondary battery.

Such an insulating inorganic particle has no particular restriction so long as it is a material having the foregoing insulating property, and capable of being adjusted in average particle diameter to 100 nm or less. Examples thereof may include alumina, boehmite, zirconia, silicon oxide, magnesium oxide, and sodium oxide. Out of these, alumina, boehmite, and nanodiamond can be preferably used. These can be used singly alone, or in combination of two or more thereof The content of the amorphous carbon-coated graphite is preferably, for example, 90 mass % or more, and more preferably 92 mass % or more for every 100 mass % of the whole negative electrode active material. The content of the amorphous carbon-coated graphite is preferably, for example, 99 mass % or less, and more preferably 96 mass % or less. Furthermore, the content of the insulating inorganic particle is, for example, preferably 1 mass % or more, more preferably 2 mass % or more, and may be 3 mass % or more for every 100 mass % of the whole negative electrode active material. The content of the insulating inorganic particle is, for example, preferably, 10 mass % or less, more preferably 8 mass % or less, and may be 6 mass % or less. The mass ratio of the amorphous carbon-coated graphite and the insulating inorganic particle is, for example, preferably 99:1 to 90:10, more preferably 98:2 to 92:8, and further preferably 98:2 to 95:5.

The negative electrode active material layer 64 may include given components other than the negative electrode active materials, for example, given components other than the negative electrode active material, for example, a thickener, a binder, and a dispersant. Examples of the thickener may include celluloses such as carboxymethyl cellulose (CMC) and methyl cellulose (MC). Examples of the binder may include rubbers such as styrene butadiene rubber (SBR), and vinyl halide resin such as polyvinylidene fluoride (PVDF).

Although the content of the negative electrode active material has no particular restriction, it is preferably 60 mass % or more, preferably, for example, 90 mass % or more to 99 mass %, and more preferably 92 mass % to 98 mass % for every 100 mass % of the total solid content of the negative electrode active material layer 64. Whereas, when a binder is used, the content of the binder in the negative electrode active material layer 64 is preferably, for example, 1 mass % to 10 mass %, and is more preferably 1 mass % to 5 mass %. When a thickener is used, the content of the thickener in the negative electrode active material layer 64 is preferably, for example, 1 mass % to 10 mass %, and is more preferably 1 mass % to 5 mass %.

2. Method for Manufacturing Negative Electrode Active Material

The method for manufacturing a negative electrode active material herein disclosed has a preparing step of preparing a paste including at least a graphite particle coated on the surface with an amorphous carbon (amorphous carbon-coated graphite), and an insulating inorganic particle, and a drying step of drying such a paste. The amorphous carbon-coated graphite for use in the preparing step has pore of 1 μm or less. Further, the insulating inorganic particle for use in the preparing step has an average particle diameter ($D_{50}$) of 100 nm or less. Then, the method for manufacturing a negative electrode herein disclosed is characterized by being carried out so that an insulating inorganic particle is filled in the pore of 1 μm or less of the amorphous carbon-coated graphite. Therefore, other manufacturing processes have no particular restriction. For example, the method may include other steps at a given stage.

(1) Preparing Step

At the preparing step, a negative electrode paste including at least an amorphous carbon-coated graphite and an insulating inorganic particle is prepared. The preparing step can be carried out typically by mixing the amorphous carbon-coated graphite and the insulating inorganic particle in the presence of a solvent, and preparing a paste. Incidentally, in the present specification, the term "paste" represents a mixture including a part of, or all of the solid content dispersed in a solvent, and includes a so-called "slurry", "ink", and the like.

In the preparing step, for the amorphous carbon-coated graphite and the insulating inorganic particle, the materials as described above can be preferably used. The amorphous carbon-coated graphite is a carbon material coated on the surface of the graphite quality material with an amorphous carbon, and has no particular restriction so long as it has a pore with a pore size of 1 μm or less. The pore of the amorphous carbon-coated graphite may preferably have a pore size of 200 nm or less. Further, in preferable one example, the amorphous carbon-coated graphite may be desirably obtained by coating an amorphous carbon on a spheroidized graphite spheroidized by applying a scaly graphite with a stress. Such an amorphous carbon-coated graphite can be prepared, for example, in the following manner. First, a scaly graphite is spheroidized by a conventionally known method. Then, the spheroidized graphite and a carbonizable material (coating raw material) such as pitch or tar serving as the precursor of the amorphous carbon are mixed. Then, burning is performed at a temperature enough to prevent progress of the graphitization of the coating raw material. Incidentally, the amorphous carbon-coated graphite may be prepared by purchasing a commercially available product.

The insulating inorganic particle has no particular restriction so long as it is an insulating particle not involved in the charging and discharging reaction, and a particle with an average particle diameter ($D_{50}$) of 100 nm or less. Specific examples thereof may include alumina, boehmite, zirconia, silicon oxide, titanium oxide, magnesium oxide, and sodium oxide. These may be used singly alone, or in combination of two or more thereof As the solvent, an aqueous solvent is preferably used. The aqueous solvent represents water, or a mixed solvent mainly including water. As the solvent other than water forming the mixed solvent, mention may be made of an organic solvent which can be uniformly mixed with water (e.g., lower alcohol or lower ketone). The aqueous solvent includes water in an amount of preferably 80 mass % or more, more preferably 90 mass % or more, and further preferably 95 mass % or more. The aqueous solvent is most preferably water.

At the preparing step, the mixing ratios (mass ratios) of the amorphous carbon-coated graphite and the insulating inorganic particle is, for example, preferably 99:1 to 90:10, more preferably 98:2 to 92:8, and further preferably 98:2 to 95:5. With mixing ratios within such a range, the pore of the amorphous carbon-coated graphite can be preferably filled with the insulating inorganic particle.

Specifically, first, a powder mixture including an amorphous carbon-coated graphite and an insulating inorganic particle mixed in a powder state therein is prepared. Then, a solvent such as water is charged little by little into the powder mixture in a plurality of times, and stiffening is performed (first kneading treatment). Subsequently, a proper amount of solvent is further added to the resulting kneaded product for kneading (second kneading treatment). At this step, although the device for use in the first and second kneading treatments has no particular restriction, examples thereof may include a planetary mixer, a disperser, a ball mill, a kneader, and a mixer. The first kneading treatment can be preferably performed, for example, using a planetary mixer under the conditions of a number of revolutions of 1500 rpm to 2500 rpm, and a treatment time of about 1 minute to 10 minutes. The solid content ratio of the negative electrode paste at the time of the first kneading treatment can be set at, for example, 60% to 70%. Further, the second kneading treatment can be preferably performed, for example, using a planetary mixer under the conditions of a number of revolutions of 1500 rpm to 2500 rpm, and a treatment time of about 1 minute to 10 minutes. The solid content ratio of the negative electrode paste at the time of the second kneading treatment can be set at, for example, 45% to 55%. Under such conditions, the first and second kneading treatments are performed. As a result, it becomes easier to preferably fill the pore of 1 μm or less of the amorphous carbon-coated graphite with the insulating inorganic particle. Incidentally, the first and second kneading treatments are not necessarily required to be carried out. A drying step described later may be carried out without carrying out the second kneading treatment according to the solid content ratio, and the like.

(2) Drying Step

At the drying step, the paste is dried so that the pore of 1 μm or less of the amorphous carbon-coated graphite is filled with the insulating inorganic particle. The drying step can be performed, for example, by performing heating using a drying device such as a drying furnace, and thereby removing the solvent from the paste. The drying temperature and the drying time may be appropriately determined according to the kind of the solvent used, and have no particular restriction. The drying temperature is, for example, 70° C. or more and 200° C. or less (typically 110° C. or more and 150° C. or less). Further, the drying time is, for example, 10 seconds or more and 240 seconds or less (typically 30 seconds or more and 180 seconds or less).

At the drying step, reduced-pressure drying may be carried out. As a result of this, it is possible to more preferably fill the pore of the amorphous carbon-coated graphite with the insulating inorganic particle. The reduced-pressure drying represents carrying out a drying treatment under more reduced pressure than atmospheric pressure. For example, the paste may be desirably dried under reduced pressure state of about 100 hPa or less, and preferably 50 hPa or less. Further, the drying temperature at this step is desirably, for example, 20° C. to 50° C. (e.g., 25° C.). Furthermore, the drying time is desirably about 1 minute to 10 minutes (e.g., 5 minutes).

In preferable one aspect, at the drying step, drying is performed so that the insulating inorganic particle is filled in 8% or more of the total volume of the pores for every 100% of the total volume of the pores of 1 μm or less present in the amorphous carbon-coated graphite. More preferably, drying is preferably performed so that the insulating inorganic particle is filled in 10% or more of the total volume of the pores, drying is further preferably performed so that the insulating inorganic particle is filled in 15% or more of the total volume of the pores, and drying is in particular preferably performed so that the insulating inorganic particle is filled in 25% or more of the total volume of the pores.

By the description up to this point, it is possible to manufacture a negative electrode active material including an insulating inorganic particle present in the pore of 1 μm or less of the amorphous carbon-coated graphite therein.

The manufactured negative electrode active material is dispersed in an appropriate solvent, thereby preparing a negative electrode active material layer forming paste. The prepared negative electrode active material layer forming paste is coated on the negative electrode collector 62, and is dried. As a result, it is possible to manufacture a negative electrode for a secondary battery including the negative electrode active material layer 64 formed on the negative electrode collector 62. Incidentally, after drying, for the purpose of adjusting the thickness and the density of the negative electrode active material layer 64, if required, an appropriate pressing treatment (e.g., a roll pressing treatment) may be carried out.

Further, the negative electrode active material layer forming paste may include a binder. Examples of the binder may include styrene butadiene rubber (SBR) and modified products thereof, acrylonitrile butadiene rubber and modified products thereof, acrylic rubber and modified products thereof, and fluorocarbon rubber. Out of these, SBR is preferable. The negative electrode active material layer forming paste may include a thickener. Examples of the thickener may include cellulose type polymers such as carboxymethyl cellulose (CMC), methyl cellulose (MC), cellulose acetate phthalate (CAP), and hydroxypropyl methyl cellulose (HPMC), and polyvinyl alcohol (PVA). Out of these, CMC is preferable.

A lithium ion secondary battery 100 using the negative electrode including the negative electrode active material manufactured as described up to this point is usable for various uses. As preferable uses, mention may be made of a driving power supply to be mounted on a vehicle such as a hybrid vehicle (HEV), a plug-in hybrid vehicle (PHEV), or an electric vehicle (BEV). Further, the lithium ion secondary battery 100 can be used in the form of an assembled battery including a plurality of cells connected in series and/or in parallel.

Test Example

Below, Examples regarding the present disclosure will be described, which is not intended to limit the present disclosure to such Examples.

1. Manufacturing of Negative Electrode

Using an amorphous carbon-coated graphite, and insulating inorganic particles having different materials and average particle diameters (D50), a negative electrode active material of each Example and a negative electrode including the negative electrode active material were manufactured.

(1) Example 1

An amorphous carbon-coated graphite (C), and boehmite (A100H, D50:92 nm) as an insulating inorganic particle were weighed at a mass ratio of 97:3. These were kneaded with ion exchanged water as a solvent. There were dried, thereby manufacturing a negative electrode active material including an amorphous carbon-coated graphite and an insulating inorganic particle. Specifically, first, a powder mixture obtained by mixing an amorphous carbon-coated graphite and boehmite using a planetary mixer was prepared. Then, a small amount of solvent (water) was charged into the powder mixture, which was kneaded at a number of revolutions of 2000 rpm for 3 minutes. The solid content ratio at this step was set at about 65%. Further, the solvent (water) was charged into a planetary mixer, and kneading was performed at a number of revolutions of 2000 rpm for 3 minutes. The solid content ratio at this step was set at about 50%. Then, the paste was subjected to vacuum drying under to conditions of reduced pressure state of 50 hPa and a drying temperature of 25° C. for 5 minutes. In this manner, a negative electrode active material of Example 1 was manufactured.

Then, the negative electrode active material of Example 1 manufactured above, CMC as a thickener, and SBR as a binder were weighed at a mass ratio of 98:1:1. These were mixed with ion exchanged water as a solvent to prepare a negative electrode paste. The prepared negative electrode paste was coated in a band shape on both surfaces of the negative electrode collector (long copper foil), and was dried. In this manner, a negative electrode of Example 1 was manufactured.

(2) Comparative Example 1

A negative electrode active material of Comparative Example 1 was manufactured in the same manner as in Example 1, except that insulating inorganic particles were not included. Then, using the manufactured negative electrode active material, a negative electrode of Comparative Example 1 was manufactured in the same manner as in Example 1.

(3) Examples 2 to 5 and Comparative Examples 2 to 6

A negative electrode active material of each Examples and each Comparative Examples were manufactured in the same manner as in Example 1, except that the materials and the average particle diameter ($D_{50}$) of the insulating inorganic particles were varied as shown in Table 1. Then, using the negative electrode active materials of Examples and Comparative Examples, the negative electrode of Examples and Comparative Examples were manufactured.

2. Manufacturing of Secondary Battery for Evaluation $LiNi_{1/3}Co_{1/3}Mn_{1/3}Mn_{1/3}O_2$ (LNCM) as a positive electrode active material, acetylene black (AB) as a conductive material, and polyvinylidene fluoride (PVDF) as a binder were weighed so as to have a mass ratio of 90:8:2. These were mixed with N-methyl pyrrolidone (NMP) as a solvent, to prepare a positive electrode paste. The slurry was coated in a band shape on both surfaces of long aluminum foil, and was dried, followed by pressing, thereby manufacturing a positive electrode.

Further, as a separator, a porous polyolefin sheet in a three-layered structure of PP/PE/PP was used.

The manufactured positive electrode, the negative electrode of each Example, and the prepared two separators were stacked, and wound, and then, were pressed from the side surface direction, thereby manufacturing a wound electrode body in a flat shape.

A positive electrode terminal and a negative electrode terminal were connected with the manufactured wound electrode body, which was accommodated in a rectangular battery case having an electrolyte solution introduction port. Subsequently, a nonaqueous electrolyte solution was introduced from the solution introduction port of the battery case, and the solution introduction port was hermetically sealed. Incidentally, for the nonaqueous electrolyte solution was prepared by dissolving LiPF6 as a support salt at a concentration of 1.1 mol/L in a mixed solvent including ethylene carbonate (EC), dimethyl carbonate (DMC), and ethyl methyl carbonate (EMC) at volume ratios of EC:DMC:EMC=3:3:4. Then, an activating treatment was performed, resulting in a secondary battery for evaluation of each Example.

3. Evaluation Test (1) Pore Distribution Measurement

Using a commercially available mercury injection porosimeter, the pore distribution of each negative electrode (negative electrode active material layer) of each Example and Each Comparative Example was measured. In Table 1, with the "total volume of pores with a pore size of 1 μtm or less" in Comparative Example 1 as 100, each "total volume of pores with a pore size of 1 μm or less" in other Examples is shown as a ratio.

(2) Metal Lithium Precipitation Resistance

Each evaluating secondary battery was placed under environment of −10° C. Thus, a charging and discharging cycle of 5-second charging at a prescribed current value, 10-minute suspension, 5-second discharging, and 10-minute suspension as one cycle was carried out 1000 cycles. Subsequently, each evaluating secondary battery was disassembled, and whether the metal lithium was precipitated on the negative electrode, or not was observed. The maximum current value of the current values at which the precipitation of metal lithium on the negative electrode was not observed was referred to as a limiting current value. The ratio of each limiting current value of other evaluating secondary batteries when the limiting current value of the evaluating secondary battery using the negative electrode of Comparative Example 1 was assumed to be 100 was determined. The results are shown in Table 1. The higher the ratio of the limiting current value, the higher the metal lithium precipitation resistance.

(3) Capacity Retention Rate After Storage Test

The manufactured evaluating secondary battery was placed under environment of 25° C., and constant current -constant voltage charging (cut voltage 1/50 C) was performed at a current value of 1/5 C up to 4.1 V, and was suspended for 10 minutes. Then, constant current discharging was performed at a current value of 1/5 C to 3.0 V. The discharge capacity at this step was measured, and was referred to as the initial capacity. After adjusting each evaluating secondary battery to a SOC of 80%, followed by storage under temperature environment of 70° C. for 40 days. Subsequently, the capacity was measured in the same manner as described above. The capacity retention rate was determined from capacity retention rate (%)=(capacity after high temperature storage/initial capacity)×100. The ratio of each capacity retention rate of other evaluating secondary batteries when the capacity retention rate of the evaluating secondary battery using the negative electrode of Comparative Example 1 was assumed to be 100 was determined. The results are shown in Table 1. The higher the capacity retention rate ratio, the higher the storage characteristics.

[Table 1]

TABLE 1

| | Insulating material | Average particle diameter (nm) | Volume ratio of pore of 1 μm or less | Limiting current value ratio | Capacity retention rate ratio |
|---|---|---|---|---|---|
| Comparative Example 1 | None | — | 100 | 100 | 100 |
| Comparative Example 2 | Boehmite | 711 | 100 | 100 | 100 |
| Comparative Example 3 | Boehmite | 404 | 99 | 101 | 98 |
| Example 1 | Boehmite | 92 | 88 | 110 | 108 |
| Example 2 | Boehmite | 54 | 75 | 118 | 115 |
| Comparative Example 4 | Nanodiamond | 493 | 100 | 100 | 100 |
| Comparative Example 5 | Nanodiamond | 253 | 101 | 99 | 101 |
| Example 3 | Nanodiamond | 100 | 92 | 105 | 104 |
| Example 4 | Nanodiamond | 14 | 64 | 126 | 132 |
| Comparative Example 6 | Alumina | 153 | 100 | 100 | 100 |
| Example 5 | Alumina | 49 | 71 | 121 | 124 |

As shown in Table 1 above, with the evaluating secondary battery using each negative electrode active material of Examples 1 to 5 including an insulating inorganic particle with an average particle diameter of 100 nm or less, it is observed that the limiting current value ratio and the capacity retention rate ratio are high. Further, for the secondary battery using each negative electrode active material of Examples 1 to 5, the pore capacity ratio of the pore size of 1 μm or less is reduced by 8% or more. This is presumed due to the following fact: for each negative electrode active material of Examples 1 to 5, the insulating inorganic particle was preferably filled in the pore of 1 μm or less of the amorphous carbon-coated graphite.

Therefore, by using a negative electrode active material including a graphite particle coated on the surface with an amorphous carbon having pores of 1 μm or less, and an insulating inorganic particle with an average particle diameter ($D_{50}$) of 100 nm or less, in which the insulating inorganic particle is present in the pore of 1 μm or less, it is possible to improve the storage characteristic and the precipitation resistance of metal lithium of the secondary battery.

Up to this point, specific examples of the technology herein disclosed have been described in detail. However, these are merely illustrative, and are not intended to limit the scope of the appended claims. The technology described in the appended claims includes various modifications and changes of the specific examples shown up to this point.

What is claimed is:

1. A negative electrode active material for a lithium ion secondary battery, comprising:

a graphite particle coated on a surface thereof with an amorphous carbon; and an insulating inorganic particle, wherein the graphite particle has a pore with a pore size of 1 μm or less, the insulating inorganic particle has an average particle diameter ($D_{50}$) of 14 nm or more and 100 nm or less, the insulating inorganic particle is present in the pore of the graphite particle, and the insulating inorganic particle is at least one selected from the group consisting of boehmite, alumina, and nanodiamond.

2. The negative electrode active material according to claim 1, wherein the pore size is 200 nm or less.

3. The negative electrode active material according to claim 1, wherein the graphite particle is a spheroidized graphite resulting from spheroidization of a scaly graphite.

4. A negative electrode for a lithium ion secondary battery, comprising:

a negative electrode collector, and a negative electrode active material layer provided on the negative electrode collector, wherein the negative electrode active material layer includes a negative electrode active material, the negative electrode active material comprises:

a graphite particle coated on a surface thereof with an amorphous carbon, and an insulating inorganic particle, the graphite particle has a pore with a pore size of 1 μm or less, the insulating inorganic particle has an average particle diameter ($D_{50}$) of 14 nm or more and 100 nm or less, the insulating inorganic particle is present in the pore of the graphite particle, and the insulating inorganic particle is at least one selected from the group consisting of boehmite, alumina, and nanodiamond.

5. A method for manufacturing a negative electrode active material for a lithium ion secondary battery, comprising:

a preparing step of preparing a paste including at least a graphite particle coated on a surface thereof with an amorphous carbon and an insulating inorganic particle; and a drying step of drying the prepared paste, wherein the graphite particle for use in the preparing step has a pore with a pore size of 1 μm or less, the insulating inorganic particle for use in the preparing step has an average particle diameter ($D_{50}$) of 14 nm or more and 100 nm or less, and in the drying step, drying is performed such that the insulating inorganic particle is filled in the pore of the graphite particle to obtain the negative electrode active material which comprises the graphite particle coated on the surface thereof with the amorphous carbon and the insulating inorganic particle, wherein the graphite particle has the pore with the pore size of 1 μm or less, the insulating inorganic particle has the average particle diameter ($D_{50}$) of 14 nm or more and 100 nm or less, the insulating inorganic particle is present in the pore of the graphite particle, and the insulating inorganic particle is at least one selected from the group consisting of boehmite, alumina, and nanodiamond.

6. The method according to claim 5, wherein in the drying step, drying is performed such that the insulating inorganic particle is filled in 8% or more of a volume of the pore for every 100% of a total volume of the pore of 1μm or less of the graphite particle.

* * * * *